United States Patent [19]

Smith

[11] Patent Number: 4,676,969
[45] Date of Patent: Jun. 30, 1987

[54] METHOD OF SYNTHESIS OF INORGANIC CHALCOGENIDES

[75] Inventor: Frank T. J. Smith, Pittsford, N.Y.

[73] Assignee: Eastman Kodak Company, Rochester, N.Y.

[21] Appl. No.: 877,084

[22] Filed: Jun. 23, 1986

[51] Int. Cl.⁴ .................... C01B 19/04; C01B 19/00; C01B 17/00
[52] U.S. Cl. .................. 423/509; 423/508; 423/511; 423/565
[58] Field of Search ............ 423/508, 509, 561 B, 423/561 R, 561 A, 565; 252/301.4 S, 301.6 S; 427/255.4

[56] References Cited

U.S. PATENT DOCUMENTS

| | | | |
|---|---|---|---|
| 2,358,661 | 9/1944 | Sarge | 423/561 A |
| 3,691,088 | 9/1972 | Pelton | 252/301.6 S |
| 3,773,909 | 11/1973 | Pearlman et al. | 423/508 |
| 4,007,055 | 2/1977 | Whittingham | 423/561 R |
| 4,348,299 | 9/1982 | Okamoto et al. | 252/301.4 S |

FOREIGN PATENT DOCUMENTS 0630042 10/1949 United Kingdom ............ 423/561 R

OTHER PUBLICATIONS

Ulrich, G., *A Guide to Chemical Engineering Process Design and Economics*, Wiley & Sons, pp. 136–137, 1984.

Primary Examiner—William R. Dixon, Jr.
Assistant Examiner—R. Bruce Breneman
Attorney, Agent, or Firm—Raymond L. Owens

[57] ABSTRACT

A method for forming metal chalcogenides is disclosed. An atmosphere of an elemental middle chalcogen is formed and a metal is reacted with the chalcogen in the vapor phase to form a metal chalcogenide powder.

2 Claims, 1 Drawing Figure

METHOD OF SYNTHESIS OF INORGANIC CHALCOGENIDES

BACKGROUND OF THE INVENTION

1. Field of the Invention

The present invention relates to a method for preparing metal chalcogenides.

2. Description Relative to the Prior Art

A common method of manufacturing metal chalcogenides is to precipitate them from aqueous solutions. This is accomplished by reacting a metal salt in solution with hydrides of chalcogens. For example, $H_2S$ (gas) is passed through a solution of cadmium nitrate to form cadmium sulfide (CdS). In this method undesirable metal oxides (CdO) are formed.

SUMMARY OF THE INVENTION

The object of this invention is to provide an improved method for producing finely divided metal chalcogenides which is not contaminated by undesirable metal oxides.

This object is achieved by a method for preparing metal chalcogenides which comprises the steps of:
  (a) vaporizing a solid phase middle chalcogen into an inert atmosphere; and
  (b) reacting a metal with such vaporized chalcogen in the vapor phase to form a finely divided metal chalcogenide.

BRIEF DESCRIPTION OF THE DRAWING

The drawing shows an apparatus which can be used to make chalcogenides in accordance with the invention.

DESCRIPTION OF THE PREFERRED EMBODIMENT

Figure 1:
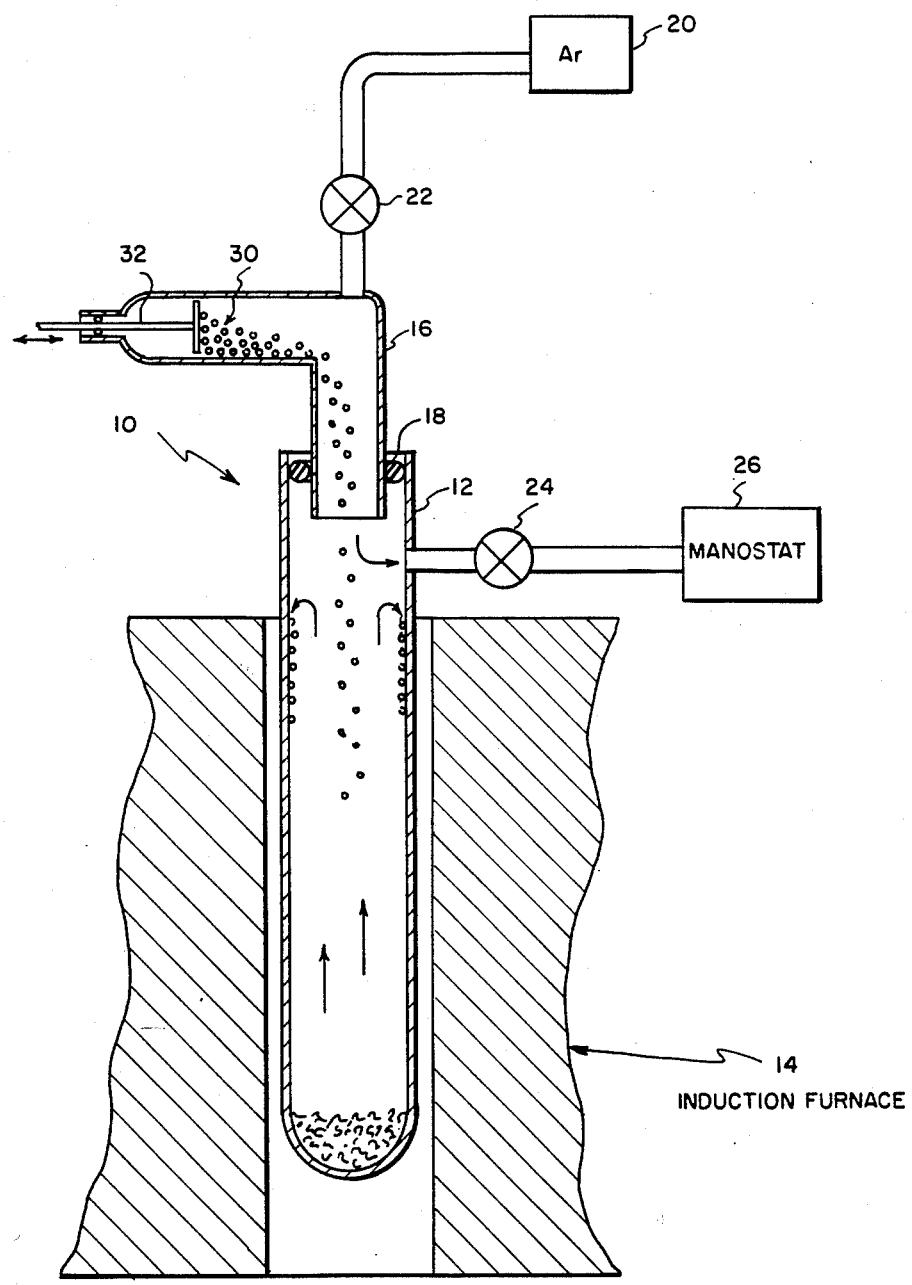

Turning now to the drawing where there is shown an apparatus 10 which can be used to practice the method in accordance with the invention. The apparatus 10 includes a container in the form of a tube 12 which can be made of fused quartz or other heat resistant material. The tube 12 is sealed at one end and is adapted to be placed within a furnace 14 such as a conventional resistance furnace. When placed in the furnace, the upper end of the tube 12 projects above the furnace 14 far enough so as to be unheated. A header member 16 is secured by o-ring seals 18 to the top open end of the tube 12. A source of inert argon gas 20 flows through a valve 22 to the interior of the header 16 and the tube 12 when the valve 22 is opened. The tube and the header are vented through a valve 24. The valve 24 is connected to a manostat 26 which can be adjusted to set the pressure inside the interior of the header 16 and the tube 12.

A middle chalcogen in accordance with this invention comprises the elements sulfur, selenium and tellurium. It is to be noted that oxygen and polonium which often are classified as chalcogens are not considered within the group of elements of middle chalcogens.

A solid phase elemental middle chalcogen is placed in the bottom of tube 12 which is then lowered into the furnace 14 and heated such that this material vaporizes completely. The vaporized chalcogen then condenses as a liquid on the wall of the tube 12 close to its upper closed end. The condensed liquid runs down the side of the tube into the furnace, boiling again when it reaches the temperature which its vapor pressure is equal to the ambient pressure, i.e., that pressure established by the manostat 26. By this refluxing action the inert argon gas is displaced out through the manostat until finally a vaporized chalcogen is established in the interior of the tube 12 at a controlled pressure.

The header 16 is provided with a horizontal portion 30 which receives metal pellets. A pusher mechanism 32 when moved horizontally causes these metal pellets to drop down the center line of the header 16 into the tube 12 without touching the walls of the header or the tube. It should be noted at this point that pellets of metal alloys are also useful if mixed compounds of chalcogenides are desired.

The metal pellets react with the vaporized chalcogen. Once started, the reaction continues spontaneously during free fall of the pellets as the result of the rapid release of heat of reaction. The tube 12 is selected to be long enough so that the reaction is completed before the metal pellets reach the lower end of the tube. As a result of this reaction, metal chalcogenides are produced in the form of a fine powder which deposits on the wall of the tube. The rate of reaction is controlled by controlling the pressure, the rate of addition of metal, and the temperature of the furnace 14. Elemental sulfur, selenium and tellurium can be obtained commercially in extremely pure states. Moreover, argon which is extremely pure is also commercially available. Further, the high temperature reaction occurs away from the walls of the tube 12 during free fall. As a consequence of the above, the resulting chalcogenides are not contaminated with metal oxides.

For example, in order to prepare copper sulfide, the temperature of the furnace 14 was maintained at 1150° C. and the pressure at one atmosphere. Copper pellets of 1 mm diameter were dropped into the sulfur vapor and burned rapidly to produce copper sulfide (CuS). In preparing silver selenide (AgSe), a furnace temperature of 1100° C. and atmospheric pressure were found effective. By using a tube 12 of 5 cm diameter and 1 meter in length, approximately 2 moles of these compounds were prepared in single batches. The compounds were not contaminated with metal oxides.

The invention has been described in detail with particular reference to a certain preferred embodiment thereof, but it will be understood that variations and modifications can be effected within the spirit and scope of the invention.

I claim:

1. A method of preparing a metal chalcogenide, comprising the steps of:
  (a) placing a solid phase elemental middle chalcogen into a container;
  (b) providing an inert gas atmosphere in such container;
  (c) heating such container to vaporize the solid phase elemental chalcogen and displace the inert gas previously provided in the container; and
  (d) dropping pellets consisting of an elemental metal into such container without touching its walls such that the metal pellets react with the vaporized chalcogen to form a metal chalcogenide.

2. The method of claim 1 wherein the metal is selected from the group consisting of cadmium, zinc, silver, copper, indium or tin and alloys thereof.

* * * * *